March 4, 1958  H. H. SHAW ET AL  2,825,573
FIELD CROP PACKING MACHINES
Filed Jan. 23, 1956  5 Sheets-Sheet 5
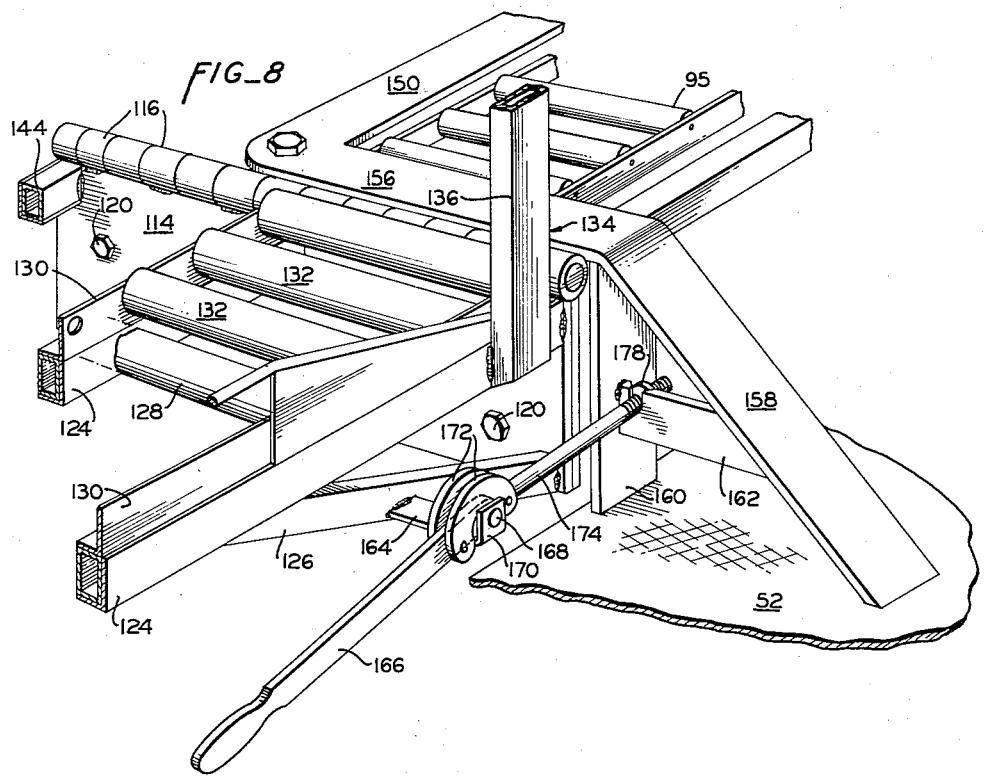
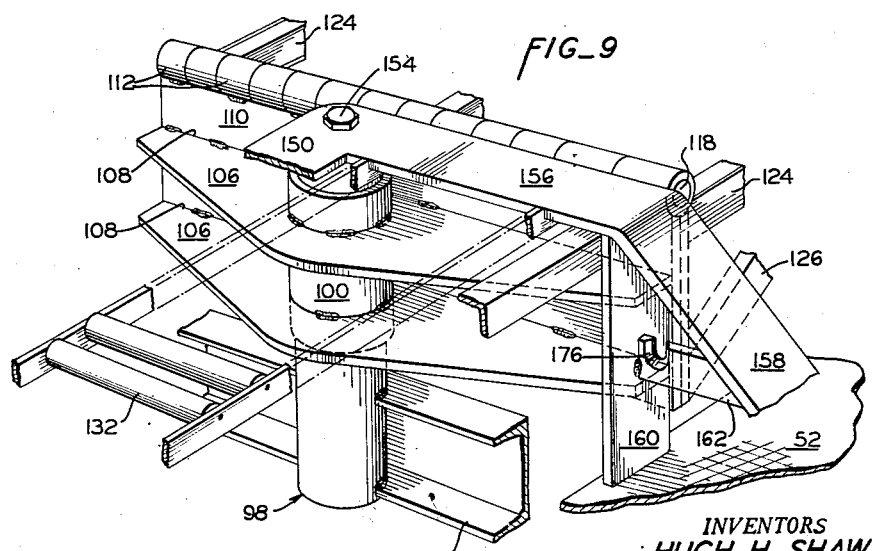
INVENTORS
HUGH H. SHAW
MARTIN I. SANDERSON
HAROLD BRADSHAW
BY Naylor & Neal
ATTORNEYS

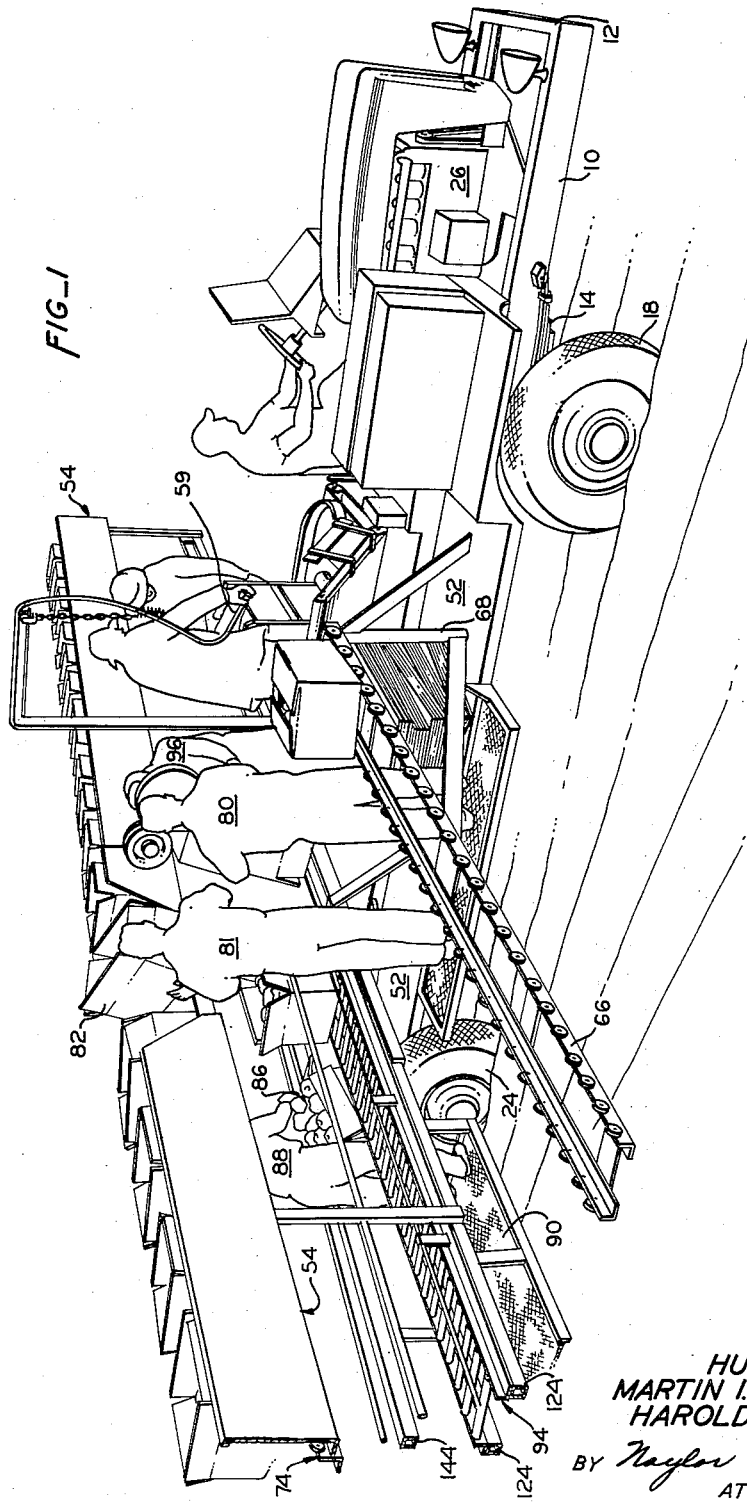

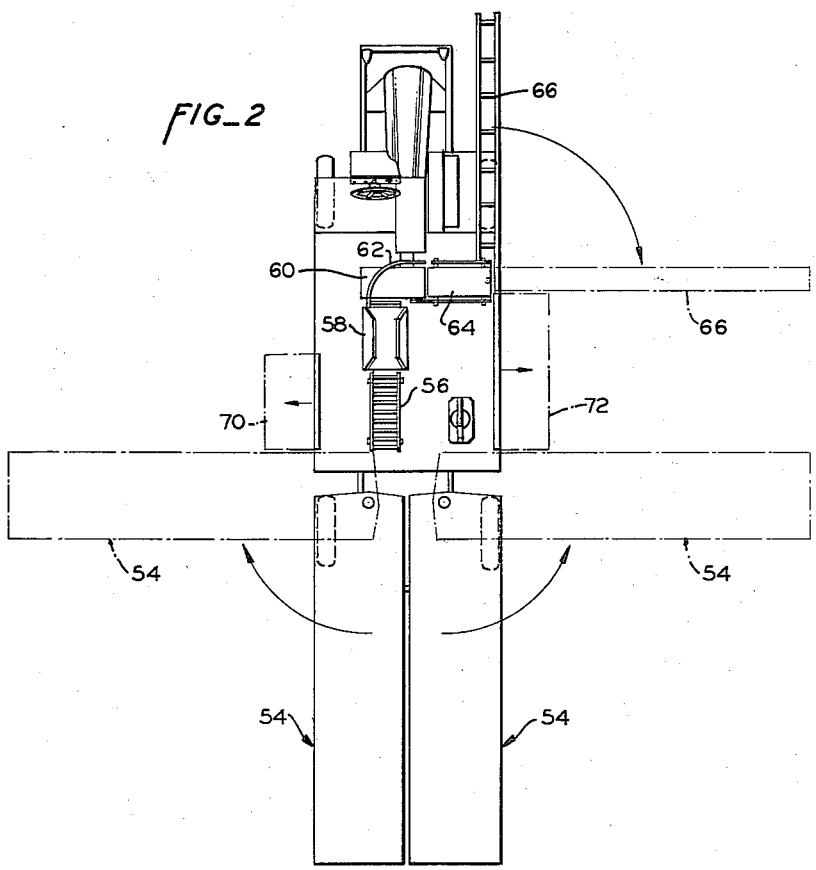

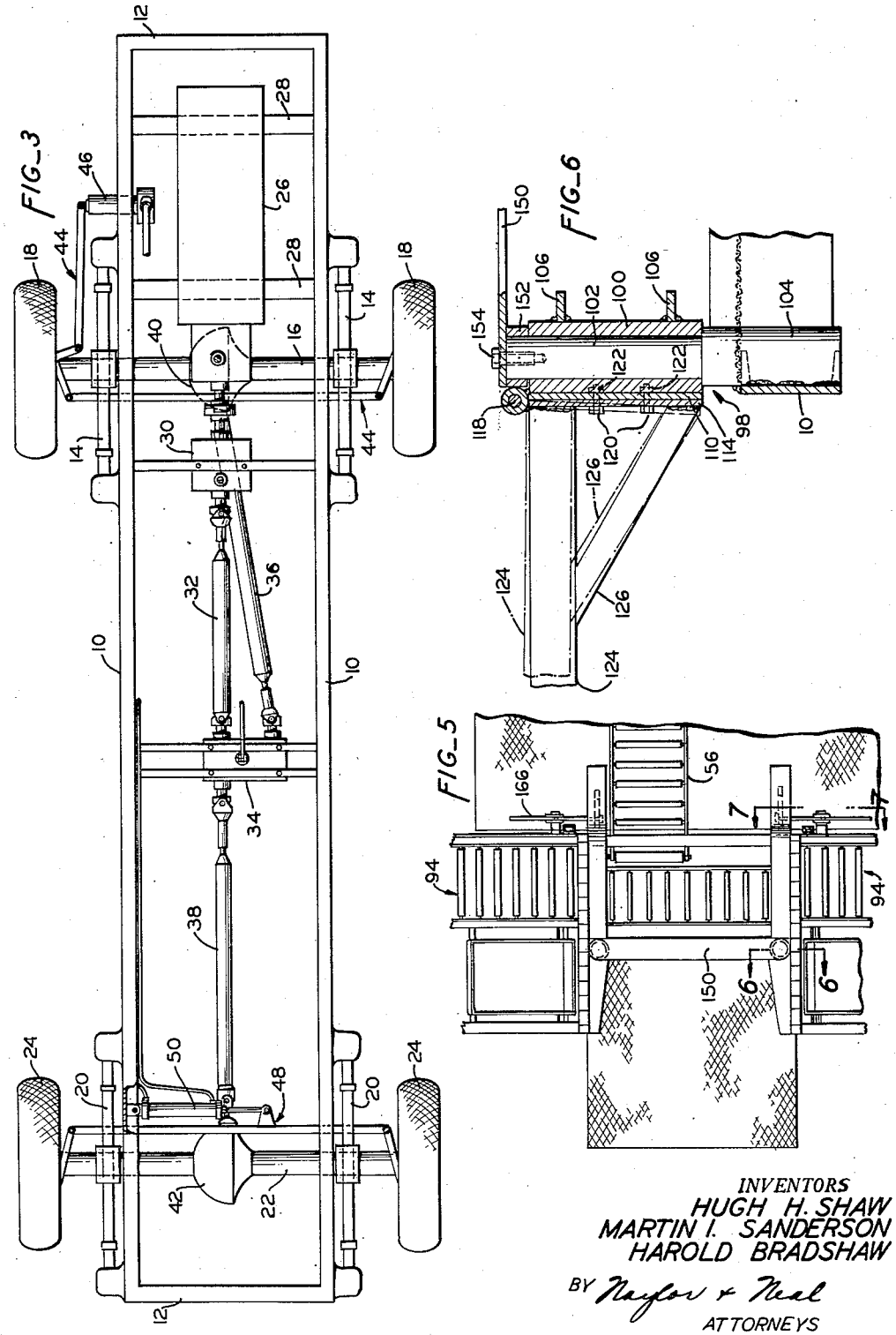

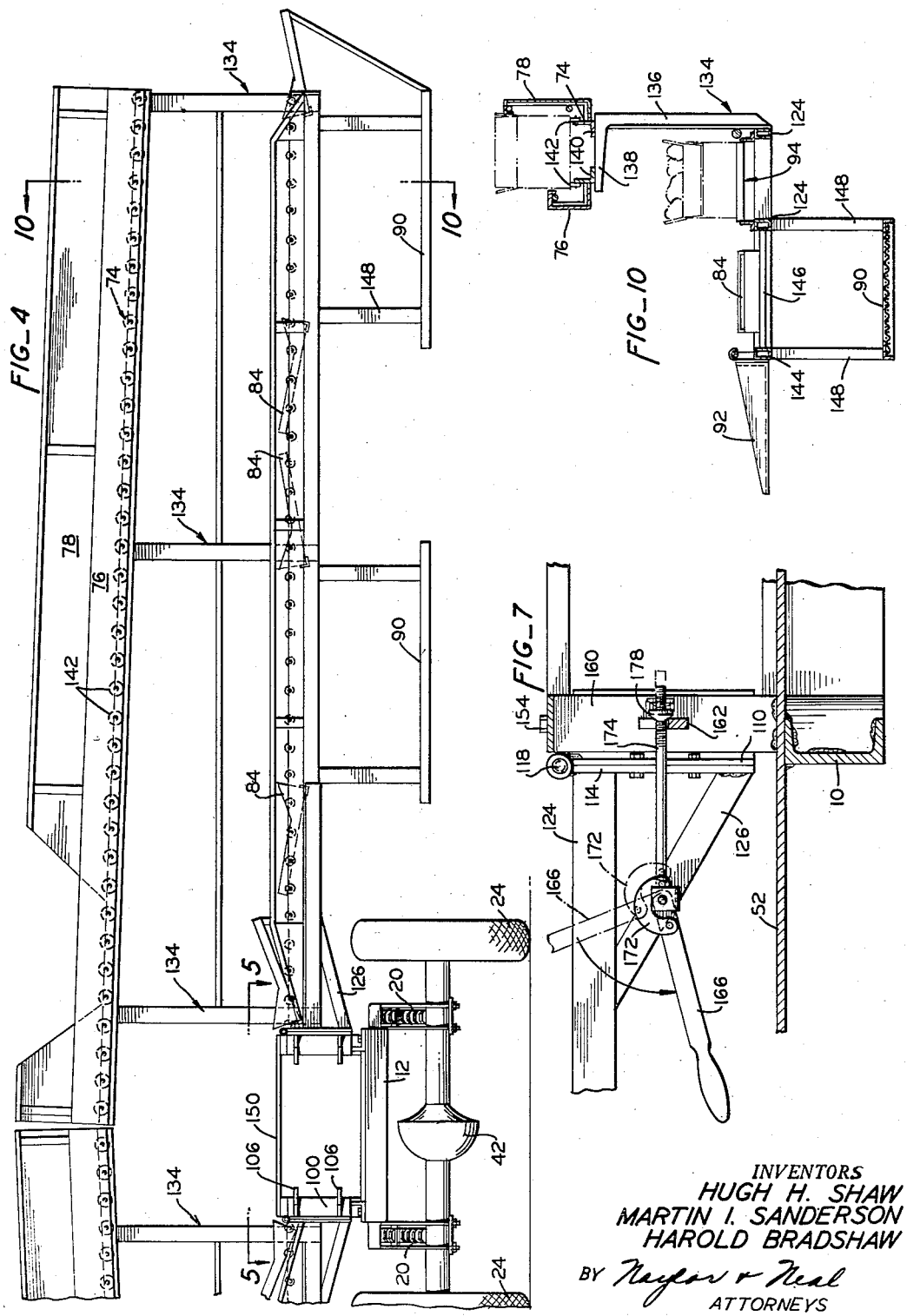

United States Patent Office 2,825,573
Patented Mar. 4, 1958

2,825,573

FIELD CROP PACKING MACHINES

Hugh H. Shaw, Martin I. Sanderson, and Harold G. Bradshaw, Salinas, Calif., assignors to Cochran Equipment Company, Salinas, Calif., a corporation of California Application January 23, 1956, Serial No. 560,742

6 Claims. (Cl. 280—34)

This invention relates to field crop packing machines of the type having wings which are foldable together for road travel and which are movable to oppositely directed spread positions for field travel, and it particularly relates to an improved pivotal cantilever suspension system for the wings wherein the wings are horizontally swingable and do not require anything in the form of supports for their outer ends.

An object of the invention is to provide a simple and efficient cantilever suspension for the pivotally mounted wings of a field crop packing machine whereby the need for wheels to support the outer ends of the wings is eliminated.

A further object of the invention is to provide, for the horizontally swingable wings of a field crop packing machine, a cantilever suspension system serving as the sole support for the wings.

Still a further object of the invention is to provide means in such a cantilever suspension system for the uplifting of the wings to counteract such sagging of the wings as may occur as a result of extended use of the machine.

These and other objects and advantages of the invention will be apparent from the following description taken in conjunction with the drawings forming part of this specification, and in which:

Figure 1 is a view in perspective of the subject field crop packing machine;

Figure 2 is a top plan view of the machine, with the solid line showing of certain elements thereof representing the traveling condition of the machine, and with the dotted line showing of certain elements thereof representing the field crop packing condition of the machine;

Figure 3 is a top plan view of the chassis of the machine;

Figure 4 is a partial view in rear elevation of the machine in field crop packing condition;

Figure 5 is a view taken along lines 5—5 of Figure 4;

Figure 6 is an enlarged detail view in section taken along lines 6—6 of Figure 5;

Figure 7 is an enlarged detail view in section taken along lines 7—7 of Figure 5;

Figure 8 is an enlarged view in perspective of a wing to truck connection;

Figure 9 is another view in perspective of a wing to truck connection; and

Figure 10 is a view in section taken along lines 10—10 of Figure 4.

With immediate reference to Figures 1-3 for a brief description of the overall appearance of the machine, the machine comprises a chassis frame formed of side rails 10 and end rails 12, means for supporting the chassis frame comprising a front set of leaf springs 14, a front driving axle housing 16 supported thereby, front wheels 18 steerably supported and driven by the front axle, a rear set of leaf springs 20, a rear driving axle housing 22, rear wheels 24 steerably supported and driven by the rear axle, a motor 26 mounted on support members 28 carried by the chassis frame, said motor being connected through differential 30 by shaft 32 to a divider box 34 which is in turn connected by shafts 36 and 38 to front wheel axle differential 40 and rear wheel axle differential 42, respectively. Linkage means indicated generally at 44 actuated by hydraulic means 46 are employed to turn the front wheels 18, and linkage means indicated generally at 48 actuated by hydraulic means 50 are employed to turn the rear wheels 24.

The chassis frame is provided with a deck 52, and there is mounted on either the chassis frame or the deck the following elements: a pair of pivotally mounted packing wings 54 adapted to be disposed in the solid line position of Figure 2 for road travel and to be disposed in the dotted line position for field travel; a roller conveyor 56 adapted to transfer filled cartons from the wings 54 to the position indicated at 58 at which point there is adjacently disposed a carton stapler 59; means comprising a flat belt conveyor 60 and a curved guard rail 62 to transport and turn the sealed cartons as they are moved off of conveyor 56; an upwardly inclined belt conveyor 64 adapted to receive the cartons from conveyor 60 and deliver them up onto a roller conveyor 66 from whence they are removed to a truck, not shown. The conveyor 66, which is attached and suitably braced with respect to a pivot post 68, is adapted to be disposed in the solid line position of Figure 2 for road travel and in the dotted line position for field travel. The machine is further provided with deck extension members 70 and 72 adapted to be moved to the dotted line position of Figure 2 for the support of workmen, for field travel.

As shown in Figures 1, 4 and 10, the wings 54 each comprise an upper roller conveyor 74, having carton retaining and guide walls 76 and 78, adapted to have fed thereon, as by the workman indicated at 80 and 81 in Figure 1, empty cartons 82, carton supporting humps 84 onto which the empty cartons are placed, after being removed from conveyor 74, and into which the field product 86 is packed, as by the worker indicated at 88 in Figure 1 who stands on a support platform 90 and takes the produce from the supply tray 92, where it is placed by the field pickers, and packs it into the cartons. The packed cartons are then lifted onto roller conveyor 94 from whence they are moved onto the fixed intermediate conveyor 95, and then onto conveyor 56, as by the workman indicated at 96 in Figure 1.

The means for pivotally supporting the wings 54 on the chassis frame are shown in Figures 4-9. Secured, as by welding, to the side channel members 10 of the chassis frame is a pair of double diametral posts 98 (Figure 6). Sleeves 100 are rotatably disposed on the smaller diametral upper portions 102 of said posts and supported by the larger diametral lower portions 104 of the posts. A pair of vertically spaced and horizontally disposed plates 106 (Figure 9) are disposed embracing relation with each sleeve 100 and are secured thereto, as by welding. To the straight edges 108 of each pair of plates 106 there is secured, as by welding, an inner hinge plate 110 which has a plurality of spaced tubular elements 112 welded to its upper edge. An outer hinge plate 114, which has a plurality of spaced tubular elements 116 welded to its upper edge, is connected to each inner hinge plate 110 by a rod 118 which extends through the interfitting tubular elements 112 and 116. The plates 114 are normally secured to plates 110 against pivotal movement with respect thereto about the rods 118 by bolts 120 which extend through the plates and are fastened thereto by nuts 122.

The wings 54 are secured to the outer hinge plates 114. The primary load bearing members of each wing 54 consist of a pair of box beams 124 which have their inner ends welded to one of the plates 114. Reinforcement struts 126 are welded to a plate 114 and a beam 124 to support the beams. The beams 124 of each pair are mutually secured together by a plurality of transversely extending tubular tie members 128. Secured to beams 124 are angle members 130 in which the roller elements 132 of conveyor 94 are journaled. Box channel posts 134 having vertically extending portions 136 and horizontally extending portions 138 (Figure 10) are secured, as by welding, to the forward one of each pair of beams 124. The horizontally extending portions 138 of posts 134 have secured thereto the angle members 140 to which are secured the roller elements 142 of the conveyor 74 and the side plates 76 and 78. A box beam 144 is interconnected by cross members 146 to each of the beams 124. The carton supporting humps 84 are supported by the cross members 146, and the beams 144 have secured thereto the wing supply trays 92. Platforms 90 are secured to hanger members 148 which in turn are secured to beams 124 and 144.

Means are provided to braceably interconnect the two posts 98, said means comprising a cross member 150 having secured to its underside sleeve caps 152 to receive the upper ends of posts 98, and bolts 154 securing member 150 to said posts. Member 150 is provided with integral forwardly directed arms 156 having downwardly inclined forward portions 158 which are welded to deck 52. The arms 156 of member 150 are further braced and supported by means comprising: vertically positioned members 160 having their lower ends welded to deck 52 and their upper ends welded to the undersides of arms 156; and by struts 162 welded to members 160 and to the downwardly inclined forward portions 158 of arms 156.

Means adapted to lock each of the wings 54 in the spread position comprise: an arm 164 welded to a strut 126; a hand-operable lever arm 166 pivotally secured by bolt 168 to an up-turned ear 170 integral with arm 164; a pair of U-shaped toggle members 172 having one end thereof pivotally connected to lever arm 166 and the other end pivotally connected to a rod 174; a notch 176 formed in strut 162 and adapted to receive rod 174; and a stop member 178 threadably engaged with rod 174. When the lever arm 166, toggle member 172, and stop member 178 are disposed in the dotted line positions of Figure 7, counterclockwise movement of lever arm 166 to the solid line position brings stop member 178 into tight engagement with strut 162 to secure the wing in the spread position. Movement of lever arm 166 from the solid line position of Figure 7 to the dotted line position enables rod 174 to be raised out of notch 176 so that the wing may be pivoted to the trailing position for road travel.

While the described pivotal cantilever suspension of the wings 54 serves to effectively carry the loads to which the wings are subjected during use, the wings tend to droop a bit after extended use. To compensate for this, i. e. to bring the wings up from the solid line position of Figure 6 to the dotted line position, the following is done: the bolts 120 are removed from plates 110 and 114; the wing raised the desired degree; a tapered shim plate, which can be considered as being represented by that portion of the solid line showing of plate 114 in Figure 6 which is not overlain by the dotted line showing of plate 114, is inserted between plates 110 and 114; and the bolts 120 are replaced.

What is claimed is:

1. Apparatus of the type described comprising a wheel supported chassis frame, a pair of oppositely disposed upright post members secured to said frame, a sleeve member rotatably disposed and supported on each post member, a pair of vertically spaced and horizontally disposed plates secured to each sleeve member, a first vertically disposed plate secured to the outer edges of each pair of first mentioned plates, a second vertcially disposed plate disposed in normally abutting relation with each of said first vertically disposed plates, hinge connections between the upper ends of said first and second plates, and an elongated cantilever wing fixedly secured to each of said second plates and extending substantially horizontally therefrom.

2. Apparatus of the type described comprising a wheel supported chassis frame, a pair of oppositely disposed upright post members secured to said frame, a sleeve member rotatably disposed and supported on each post member, a pair of vertically spaced and horizontally disposed plates secured to each sleeve member, a first vertically disposed plate secured to the outer edges of each pair of first mentioned plates, a second vertically disposed plate disposed in normally abutting relation with each of said first vertically disposed plates, hinge connections between the upper ends of said first and second plates, an elongated cantilever wing fixedly secured to each of said second plates and extending substantially horizontally therefrom, and fastening means adapted to maintain said first and second plates in abutting relation, said means being removable whereby shims may be placed between said first and second plates to eliminate any sag from said wings.

3. Apparatus of the type described, as set forth in claim 2, further comprising a tie member interconnecting the upper ends of said post members and adapted to mutually brace said post members.

4. Apparatus of the type described comprising a wheel supported chassis frame, a pair of elongated wings adapted to extend substantially horizontally from said frame without wheel supports, and means for connecting said wings to said frame for pivotal movement about vertically disposed axes, said means including for each wing a pair of vertically disposed abutting plates extending for substantially the width of the wing and being hingedly connected together at their upper ends, said wings being fixedly secured to the outer plates of said pairs of plates.

5. Apparatus of the type described comprising a wheel supported chassis frame, means connecting a pair of elongated wings having no wheel supports to said frame for pivotal movement about vertical axes, and means forming a continuous horizontally disposed hinge line connection between said wings and said frame whereby said wings may be adjustably moved upwardly about said pivotal connection to compensate for any sagging of said wings.

6. Apparatus of the type described comprising a wheel supported chassis frame, means connecting a pair of elongated wings having no wheel supports to said frame for pivotal movement about vertical axes, means forming a horizontally disposed pivotal connection between said wings and said frame whereby said wings may be adjustably moved upwardly about said pivotal connection to compensate for any sagging of said wings, and means rigidly disposed in mutually bracing relation with said wings without interfering with either pivotal movement or adjustable movement thereof.

References Cited in the file of this patent
UNITED STATES PATENTS

| | | |
|---|---|---|
| 2,321,387 | Jackson | June 8, 1943 |
| 2,590,965 | Huston | Apr. 1, 1952 |